United States Patent [19]
Mammone et al.

[11] Patent Number: 5,634,087
[45] Date of Patent: May 27, 1997

[54] RAPIDLY TRAINABLE NEURAL TREE NETWORK

[75] Inventors: Richard J. Mammone, Bridgewater; Ananth Sankar, Plainsboro; Kevin R. Farrell, Ocean Grove, all of N.J.

[73] Assignee: Rutgers University, New Brunswick, N.J.

[21] Appl. No.: 159,397

[22] Filed: Nov. 29, 1993

Related U.S. Application Data

[63] Continuation-in-part of Ser. No. 662,423, Feb. 28, 1991, abandoned.

[51] Int. Cl.$^6$ .................................................. G06F 15/18
[52] U.S. Cl. ........................ 395/24; 395/21; 395/22; 395/23; 395/27
[58] Field of Search ............................... 395/21, 22, 23, 395/24, 27

[56] References Cited

U.S. PATENT DOCUMENTS

| | | | |
|---|---|---|---|
| 4,805,129 | 2/1989 | David | 395/24 |
| 4,947,482 | 8/1990 | Brown | 395/24 |
| 4,979,126 | 12/1990 | Pao et al. | 395/27 |
| 5,052,043 | 9/1991 | Gaborski | 395/23 |
| 5,058,034 | 10/1991 | Murphy et al. | 395/23 |
| 5,119,469 | 6/1992 | Alkon et al. | 395/23 |
| 5,136,686 | 8/1992 | Koza | 395/13 |
| 5,138,695 | 8/1992 | Means et al. | 395/27 |
| 5,166,539 | 11/1992 | Uchimura et al. | 395/24 |
| 5,263,124 | 11/1993 | Weaver et al. | 382/37 |
| 5,271,090 | 12/1993 | Boser | 395/21 |
| 5,319,587 | 6/1994 | White | 395/27 |
| 5,355,436 | 10/1994 | Shin et al. | 395/24 |
| 5,359,700 | 10/1994 | Seligson | 395/24 |

*Primary Examiner*—George B. Davis
*Attorney, Agent, or Firm*—Peter K. Trzyna

[57] ABSTRACT

An apparatus and methods characterized by an electric neural network including a node having multipliers respectively receiving signals representing feature vector elements and signals representing weight vector elements to produce product signals, a summer to add the product signals with a bias signal and output a sum signal to a hard limiter, the hard limiter for outputting a preliminary output signal of polarity. In response to the output signal of polarity, one of at least two logic branches is enabled. In response to such enabling, weight elements are assigned to a next weight vector to be used in subsequent processing by the one of the at least two logic branches until a label is to be produced.

61 Claims, 6 Drawing Sheets

RAPIDLY TRAINABLE NEURAL TREE NETWORK

CLAIM TO PRIOR APPLICATION

This is a continuation-in-part of U.S. patent application Ser. No. 07/662,423, filed Feb. 28, 1991, now abandoned.

FIELD OF THE INVENTION

The present invention involves an information processing system organization and structures therefore, particularly binary, digital systems, sequential processor systems, training, and pruning. More specifically, the present invention includes a rapidly trainable neural tree network, its retrieval and training modes and pruning of the structure, and pattern recognition applications including speech, face, and bomb detection.

BACKGROUND OF THE INVENTION

"Pattern recognition" refers to classifying an object or event into one of several pre-specified categories. This process can be broken down into two steps. The first step is "feature extraction," which includes selecting parameters that will allow the object or event to be distinguished from another and detecting values for these parameters. The second step is "classification," which uses the values (i.e., data) obtained from the feature extraction to make a classification decision.

As an example of pattern recognition, consider the task of automatically determining whether a person is a male or a female. First, a feature extractor will extract specific data about pre-selected parameters characterizing the person, e.g., height and weight. This data is typically combined in what is known as a feature vector. Here, the feature vector is two dimensional, where one dimension is for height and the other for weight. The space containing such feature vectors is known as feature space. The feature vector for height and weight will then be used by a classifier to decide whether the person is a male or a female.

Conventional classifiers apply statistical analysis techniques to the data to make decisions. Typically, for each class, a mean and a variance are estimated for scaler data, or a mean vector and a covariance matrix are estimated for multidimensional data. Bayes decision theory (see for example, "Pattern Recognition and Scene Analysis," R. O. Duda and P. E. Hart, Wiley, 1973) can then be used to locate a decision boundary, known as a "discriminant," which divides the data according to the classes. Data falling on one side of the boundary will belong to one class whereas data falling on the boundary or on the other side of the boundary will belong to another class.

As an example, consider the male/female classification previously mentioned. Considering only the "weight" feature, if the average weight for females is estimated as 110 pounds and the average weight for a male is estimated as 170 pounds, and both these measurements have equal variance, then a discriminant boundary would be located at 140 pounds. Thus, a person weighing over 140 pounds would be classified as male, and otherwise would be classified as female.

Classifiers based on statistical decision theory, such as that described above, rely upon accurate estimates for the parameters of probability density functions. A probability density function (PDF) refers to a model for the statistical properties of a random signal. Common statistical properties for a PDF used in pattern recognition are the previously mentioned mean and variance parameters. However, these properties have short-comings for problems where it is difficult to estimate the PDF parameters, whether it be due to insufficient data, high dimensional feature vectors, etc. It is well-known in pattern recognition that the higher the dimension of a vector, the more difficult it is to estimate its statistical properties.

Recently, to overcome some of these problems neural networks have been suggested as an alternative to the above-described classifiers. Neural networks attempt to model the pattern recognition capabilities of a human brain by interconnecting simple computational elements. These individual computational elements are known as "neurons."

Each neuron computes a weighted sum of an input vector. The sum essentially defines a boundary line for classifying data. For a two dimensional feature vector, a boundary line is formed in accordance with the equation $W_1X_1+W_2X_2=D$, where $X_1$ and $X_2$ are measured features for which the corresponding feature vector is $[X_1 \ X_2]$; the W's (usually called the "weights") comprise the "weight vector" and are perpendicular to the boundary line that separates the classes; and the D is the distance of the line from the origin.

The above equation represents a weighted sum of the input features. If this weighted sum is greater than the variable D, then the input is said to belong to one class. If the weighted sum is not greater than D, the input is said to belong to the other class. Typically, the D is absorbed into the weight vector by augmenting the feature vector with a "one" (i.e., $[X_1 \ X_2 \ 1]$, $W_1X_1+W_2X_2-D=0$, or $W_1X_1+W_2X_2+W_31=0$, where $W_3=-D$ (the weight $W_3$ corresponding to the offset D, is commonly known as a "bias").

The classification decision can be made by evaluating the dot product of the weight vector $[W_1 \ W_2 \ W_3]$ with the feature vector $[X_1 \ X_2 \ 1]$. If the value of the dot product is greater than zero, the data belongs to one of the two classes (i.e., the data is on one "side" of the boundary). Likewise, if the value is negative, the data does not belong to that class. This is numerically equivalent to evaluating $W_1X_1+W_2X_2=D$, but is notationally more convenient.

The weighted sum can be applied to a hard limiter, which makes any value above 0 equal +1 and any number below 0 equal to −1. The output of the hard limiter is the neuron output.

A commonly-used alternative is to apply the weighted sum to a soft limiter. This is typically accomplished by applying the value to a "sigmoid" function. For a value y, the sigmoid of y is defined as $f(y)=1/(1+e^{-\alpha y})$, where $\alpha$ is some constant, e.g., $\alpha=1$. The sigmoid is a S-shaped function that asymptotically approaches +1 or 0 as y approaches positive or negative infinity, respectively. The sigmoid can be easily modified to approach +1 and −1, as the hard limiter. As contrasted to the hard limiter (which can provide only +1 or −1 values), the sigmoid provides a more gradual transition between these two levels.

For two dimensional features, the discriminant is a line in feature space. For features of a dimension greater than two, the discriminant will be a hyperplane. That is, in "n" dimensional space (i.e., beyond just two or three dimensions, such as twenty dimensions), the line is replaced with a "hyperplane" in "hyperspace." The test, then, is whether the data is on one side of a hyperplane or the other.

To make a classification decision, it may be necessary to use many of these neurons—an array of these neurons, each of which constructs lines or hyperplanes in feature space and outputs a +1 or a −1. So, if the task at hand is to recognize ten people (i.e., each person represents a class) from some features from digitalized photographs of their faces (e.g., their eyes, the length of their noses, the distances of their lips, and so on), the process makes linear separations in feature space. The number of neurons must be sufficient to partition the feature space into distinct regions corresponding to each person within this set of ten people.

Arrays of neurons, such as that described above, are only capable of solving problems that are linearly separable (i.e., the two classes can be separated by a single line). For problems that are not linearly separable, many layers of neurons can be required to do a piece-wise linear approximation to partition feature space into distinct regions. Mathematically, if this process is followed enough times, one can approximate any "decision surface," i.e., any kind of curve or arbitrary function that is needed to separate one class from another.

After data is processed by the first layer of neurons, the outputs of these neurons can be used as inputs to a second layer of neurons, known as a "hidden layer." Thus, if there are five neurons in an input layer, each node in the next (or "hidden") layer will have five inputs. The hidden layer processes the outputs from the first layer with additional weights in the same fashion as for the input layer. The purpose of the hidden layers in this "feed-forward architecture is to solve non-linearly separable problems (i.e., when two classes can not be separated by a single line). The outputs of the hidden layer can be used as inputs to another hidden layer, which operates identically to the first hidden layer, or can be used as inputs to an "output layer." The output layer has one or more neurons, whose output(s) represent the final decision of the classifier. In neural networks of this architecture, soft limiters are used between the neurons of each layer and one (or more) hard limiter(s) is used after the output layer to help define the final decision by producing an electrical output of +1 or −1.

The neural network structure used to implement this process is known as a multi-layer perceptron (MLP), which is shown in FIG. 1. The MLP is a powerful computing tool, but it presents many technical challenges in implementation. These challenges include the challenge of efficiently training the MLP to solve a problem, and the challenge of selecting the proper architecture, i.e., number of neurons, number of layers, etc., to solve the problem.

A. MLP Training

In about the 1980's, a process for training an MLP was discovered. The process uses what is know as a "gradient descent" process. The feature vector is input to all the neurons in the front (input) layer. The outputs of the input layer are used as inputs to the hidden layer, and so on, until the output layer is reached.

At the output layer, the desired output value is compared to the actual output of the MLP. "The error" is defined as the difference between the actual output and the desired output. The error is fed backwards (i.e., from the output to the input) into the MLP to adjust the weights in the network, making the output closer to the desired output. This technique is known as "back-propagation." To continue the training process, the next feature vector is input and the above-described process is repeated. Again, the error is propagated back into the system and the weights are adjusted to reduce the error. By processing all of the feature vectors many times with this approach, the MLP will usually reduce the overall error and essentially learn the relation between the feature vectors and their corresponding classes. Thus, a trained MLP should be capable or retrieving the correct class when given a feature vector for that class. (For further information about the back-propagation process, see D. E. Rumelhart and J. L. McClelland, *Parallel Distributed Processing*, MIT Cambridge Press, 1986.)

In the first phase of MLP training, all of the weights are initially set with random numbers. Therefore, essentially all hyperplanes are randomly positioned in feature space. Then the back-propagation process is used to adjust the hyperplanes to organize and discriminate among the data.

Training an MLP usually takes a long time because the MLP is learning everything at once; i.e., the proper location of each hyperplane. Over the years, people have tried many approaches to speed up training, but have yet to find a simple solution to this problem.

Another problem with this training process is that an MLP frequently gets "trapped;" it trains for a long time and cannot solve the problem. The error function whose minimization is desired can be viewed as a line with many curves. The best solution will correspond to the point on this curve corresponding to the global minimum, i.e., the lowest "valley." The MLP is prone to getting stuck in a local valley minimum and not converging the global minimum. To find a better solution, the MLP's must exit the valley, go over a peak, look for another minimum, and continue hunting until the global minimum is found. When an MLP gets stuck in a local minimum, it is necessary to dump out all the data and randomly restart somewhere else to see if the global minimum can be found. Not only is this approach extremely time consuming, it is also heuristic and thus, there is no guarantee that a solution will ever be found.

An MLP can also be very expensive with respect to hardware implementation. Companies, such as Intel, are selling neurons on a chip, but they do not seem to be in use extensively and effectively. Instead, Digital Signal Processor (DSP) chips are used. A DSP chip is a fast computer comprising an analog/digital (A/D) converter coupled to hardware multipliers. A DSP chip can cost often more than a dollar each, and at a million neurons (chips), for example, the MLP can be very expensive.

B. MLP Testing

Another challenge presented by an MLP involves testing to determine how well the neural net generalizes. The ability of a neural net to generalize from output data is analogous to the situation in which a child learns to generalize from seeing a few chairs: the child does not need to have every chair in the world pointed out—the child generalizes from what is known about a few chairs. So too can MLP's generalize, say, to recognize a known face though it is contorted with a grimace or a smile.

This "generalizing" process illustrates a difference between an MLP and a device which stores data about faces in a look-up table. The interconnections between the neurons store data in a highly encoded and compact way, similar to the way neurons in a brain function. This permits generalizing instead of merely retrieving data from a look-up table.

C. Decision Trees

Decision trees, refer to FIG. 2, are another approach to the pattern classification problem. A decision tree is a tree structure comprised of nodes (i.e., nodes are the basic unit of a tree structured for a decision). The bottom-most nodes of the tree are known as "leaf nodes," and represent the different classes of the problem. A feature vector, to be classified, is first applied to the top most node of the tree, known as a "root node" or simply the "root." After being processed by the root node, the feature vector will be sent to the appropriate node at the next level in a pattern resembling a branch in the decision tree, etc., until the feature vector reaches a leaf node, where the feature vector is classified in the category belonging to that leaf. In feed-forward-feed neural networks, the classification decision is made in the last layer, i.e., the leaf layer, and not in the intermediate layers.

As an example of a decision tree, consider the problem of discriminating between males and females as previously described. The first node may decide that if the weight is greater than 140 pounds, the person is a male. If the weight is equal or less than 140 pounds, the next node checks if the height is less than 5'8". If it is, then the leaf node classifies the person as a female; otherwise, the person is classified as a male.

Decision trees are advantageous in that they (1) train fast and (2) have a self-organizing architecture that does not have to be specified beforehand.

But decision trees are not without their limitations. Most decision tree processes only consider one feature at a time for the classification decision, which creates discriminant boundaries perpendicular to the feature axes. For example, in the above case, the decision for whether the weight is above or below 140 pounds is implemented by a discriminant that is perpendicular to the weight axis at the point 140. This is a severe limitation for linearly separable problems that might require a diagonal discriminant, as illustrated in FIG. 3a versus FIG. 3b. Note that to partition such classes, a staircase-like discriminant is necessary, requiring a node for each line. On the other hand, a single diagonal discriminant, which can be implemented by a single layer perception (also known as a neuron) in an MLP, can separate the two classes. Several decision tree processes, such as CART and ID3 are described by Breiman and Freeman in *Classification and Regression Trees*, Wadsworth International Group, Belmont, Calif. 1984.

SUMMARY OF THE INVENTION

A. Objects of the Invention

It is an object of the present invention to provide a neural network that is less expensive to build.

It is an additional object of the present invention to provide a neural network that can have a faster retrieval time.

It is a further object of the present invention to provide a neural network that is easier to train than multi-layer perceptions using the back propagation process.

It is another object of the present invention to provide a neural network that has a self-organizing architecture (i.e., an architecture that is not completely pre-specified).

It is yet another object of the present invention to provide a neural network with a training process that will always converge to the global solution.

It is still another object of the invention to provide a neural network that is capable of partitioning feature space with diagonal discriminants (as opposed to discriminants that must be perpendicular to the feature axes, as in decision trees).

B. Summary of the Invention

These objects of the present invention, which will be appreciated from the drawings and the more detailed description of the invention herein, are accomplished by means of a neural tree network (NTN). The NTN is a hierarchical classifier that combines properties of feed-forward neural networks and decision trees. The NTN uses a tree architecture to implement a sequential, linear, decision-making process. The decision-making process is sequential in that the outcome of one decision determines the next decision to be evaluated. Each node at each level of the NTN corresponds to a decision and uses an exclusive subset of the training data. For a binary (i.e., two class) NTN, the root, or top-most node, is provided with a feature vector. Based on the decision output at the root, the feature vector will be directed to a selected child node corresponding one of at least two decision paths: a "left path" or a "right path." The selected node is used in the same manner, i.e., the child node decides if the feature vector should be directed to the next left node or the next right node. This process continues until the feature vector arrives at the bottom-most node, known as a "leaf node." At this point there is no decision remaining to be made, and the feature vector is assigned the classification label corresponding to that leaf node.

The process of the present invention is similar to that of a decision tree. However, a key difference is that the decisions of a decision tree consider only one feature at a time, such that discriminant boundaries are restricted to being perpendicular to the feature axes. The decisions of a NTN are based on the output of a neuron, which uses the whole feature vector (not just a single feature). This allows for a diagonal discriminant. Therefore, the NTN combines the convenient hierarchical decision structure of a decision tree with the flexible discriminant location provided by a neuron, or feed-forward neural network.

A NTN also can be used to solve multiclass (i.e., more than two class) pattern recognition problems. For an M class problem, the NTN uses a maximum of M neurons per node to implement the decision strategy. To clarify this concept, consider the male/female discrimination example, except that there now is a desire to discriminate between men, women, and children, i.e., a three class problem. The first node of the NTN (the root node) will use three neurons to partition the feature space as best as possible. Each of these neurons correspond to a path that has another node with three neurons, and so on.

For testing, a feature vector is applied to each of the three neurons at the root node. The neuron having the maximum output selects the node at the next level to which this feature vector is sent. The feature vector is then applied to each of the three neurons for this child node, and again the child node at the next level is selected corresponding to the maximum neuron output. This process continues until the feature vector reaches a leaf node, at which point the feature vector will be assigned the label of that leaf.

With regard to the objects and advantages of the present invention, training an NTN requires much less time than training a MLP. Training a root node for a NTN involves having that node see all the feature data to divide the data into two portions. As compared with a MLP, the first NTN node trains very quickly because it has only M neurons, where M is the number of classes. Also each NTN neuron is trained individually, in contrast to the MLP, where all neurons are trained simultaneously and thus take much more time for convergence. Also, unlike an MLP, the nodes at each next level of the NTN are provided with a partitioned subset of the feature data, which is less than the original amount of the feature data. Because the next nodes use only a subset of the original feature data, they train even quicker, etc. This training approach is significantly faster than that of the MLP.

Also unlike an MLP, the NTN architecture is self-organizing, i.e., given a set of training data, it will automatically determine the structure of the tree necessary to completely classify this data. It is not necessary for the user to completely pre-specify parameters, such as number of levels in the tree, the number of nodes, the number of leafs, etc. The MLP, however, requires complete pre-specification of the architecture prior to training. Therefore, the number of layers, nodes, etc. is a variable parameter in an MLP, that must be pre-specified by the user, usually leading to a trial and error approach to determining the best MLP architecture, in contrast to the approach for the NTN.

Building a hardware implementation of the NTN is also less expensive than that of the MLP. The NTN can be conveniently implemented with one node. Each NTN node takes the dot product of a vector, followed by a hard limiting of the output(s). This same operation is performed by all nodes in the tree, except that different nodes receive different weight vectors. Therefore, a single processor chip can be dedicated to node operations, a memory device can store the weight vectors and, based on output from the node, the memory device can input the next weight vector into the same node. Thus, a one neuron/memory approach can produce a result similar to that of a multi-neuron network. This is in contrast with an MLP, in which all many neurons must be evaluated simultaneously, thus requiring a more complicated parallel implementation.

Note that the MLP can be faster than an NTN for a parallel processing implementation. In an MLP, the nodes of each layer can be processed in parallel. Thus, an MLP with four layers would require four clock cycles. The number of clock cycles for the NTN is given as $\log_M$ (number of nodes), where M is the number of classes. Thus, for a two class problem with 1000 nodes, the NTN would require roughly $\log_2 1000=10$ clock cycles. In most applications, ten cycles as compared to four clock cycles is not a drastic difference in speed. This slower speed would, in most cases, be more than compensated by the reduced hardware cost as compared to the MLP.

The NTN will also generally have a much faster retrieval time than the MLP when both are implemented on a serial machine, such as a personal computer. "Retrieval time" refers to the time necessary to classify a feature vector. The time an NTN requires to classify a feature vector is proportional to the length of the path from the root node to the leaf node. The average length of this path for an NTN is $\log_M$ (number of nodes) for an M class tree. As an example, consider two class (M=2) problem. A binary NTN tree starts with one root node that leads to two "child" nodes. Each one of the two child nodes leads to two more child nodes, etc. To get from the root node to any one of the leaf nodes of a balanced binary tree with say seven nodes, a maximum of three nodes ($\log_2 7 \approx 3$) are evaluated. (A balance tree refers to a tree where the leaves are all on the same level or on adjacent levels, i.e., all paths from the root to a leaf are roughly equal.) The NTN only evaluates those notes on the decision path whereas a MLP must have all nodes evaluated.

DETAILED DESCRIPTION OF A PREFERRED EMBODIMENT OF THE INVENTION

The invention can be used in two modes: retrieval and testing, each of which is discussed in detail below. Generally, though, the training mode of the invention can be implemented in software to execute on a digital computer. Essentially, the training mode will take a number of input patterns and find the weight vectors corresponding to the discriminants necessary to partition these input patterns. Training is usually done once in a factory or in a laboratory, often by means of a large computer. After the weight vectors are learned via the training process, the weight vectors are output to a file. The contents of this file are used during the retrieval mode of the invention.

The retrieval mode of the invention can be implemented in either software or hardware. The software implementation will input the weight file determined during the training mode, along with the patterns to be classified, and will output the labels for these patterns. For the hardware implementation, the weights are first stored in a memory device, such as a PROM. A multiplier along with the appropriate control logic can be used to classify a set of input patterns.

For an implementation of the invention using software, the retrieval and training modes are most conveniently implemented as separate programs. (See the appendix of this patent application.) In any case, though, retrieval and training modes are discussed with greater particularity below.

1. Retrieval Mode

Figure 1:
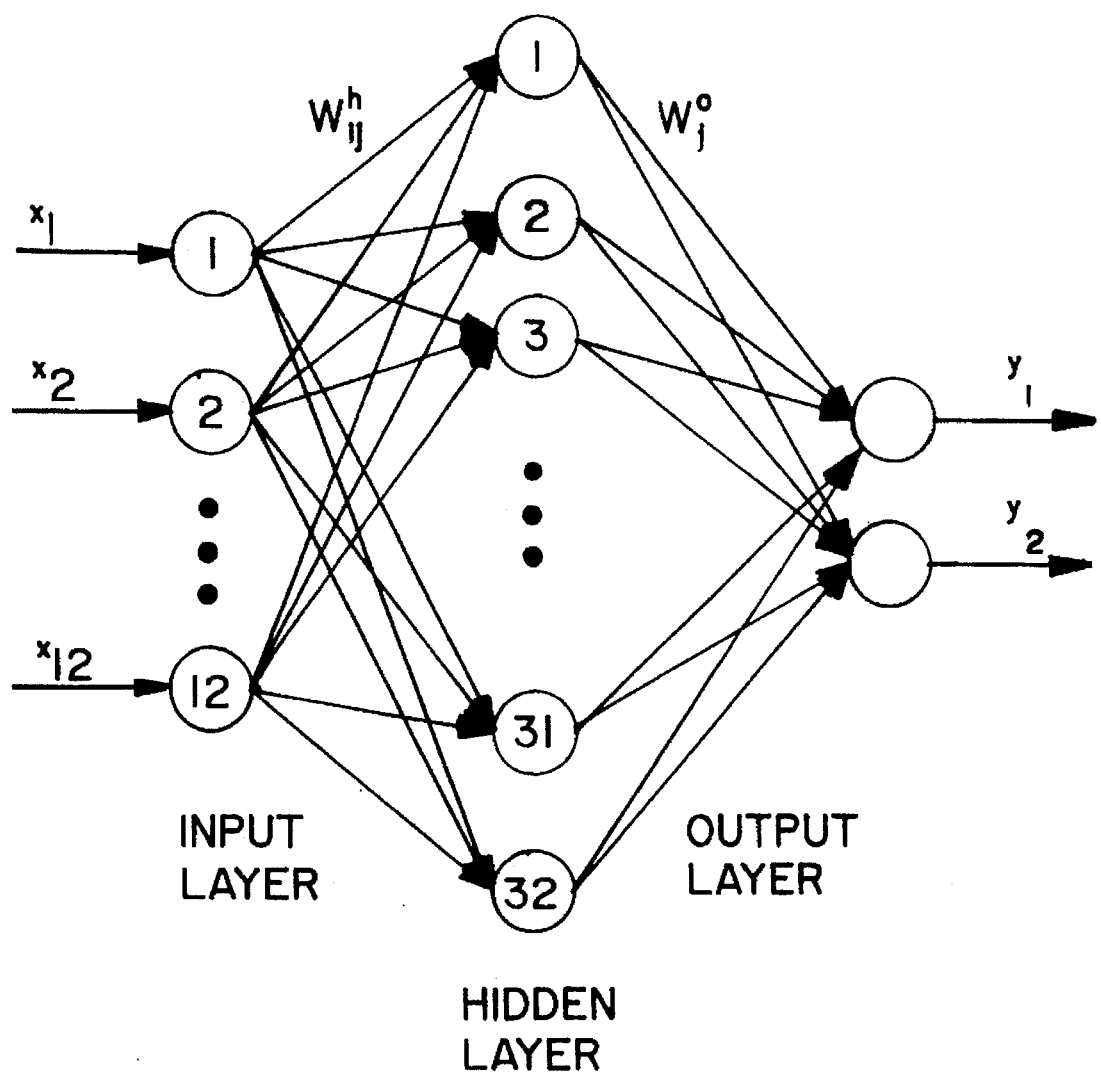
FIG. 1 is a representation of the (prior art) architecture of multilayer perception.
Figure 2:
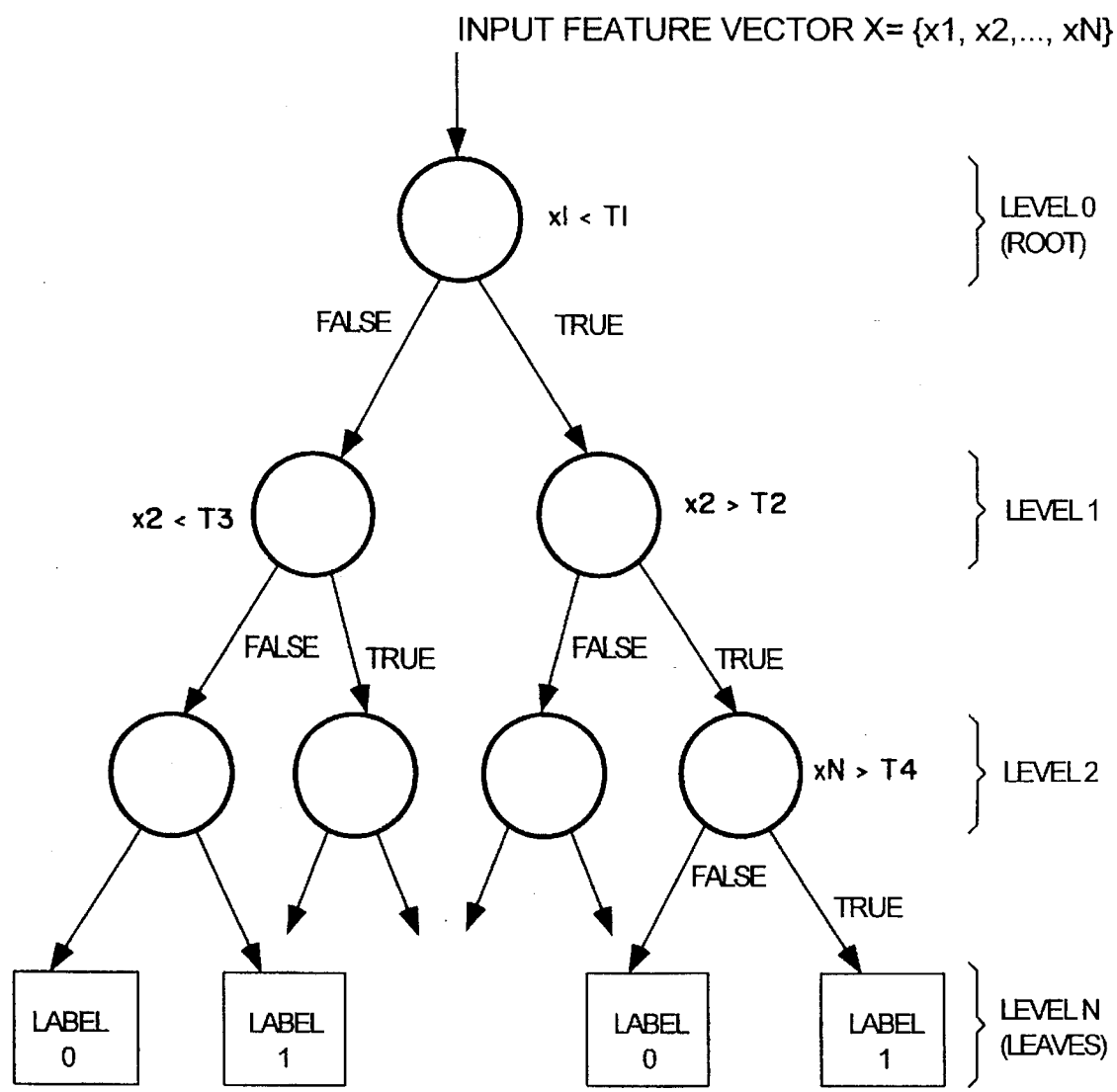
FIG. 2 is a representation of the (prior art) architecture of a decision tree.
Figure 3A:
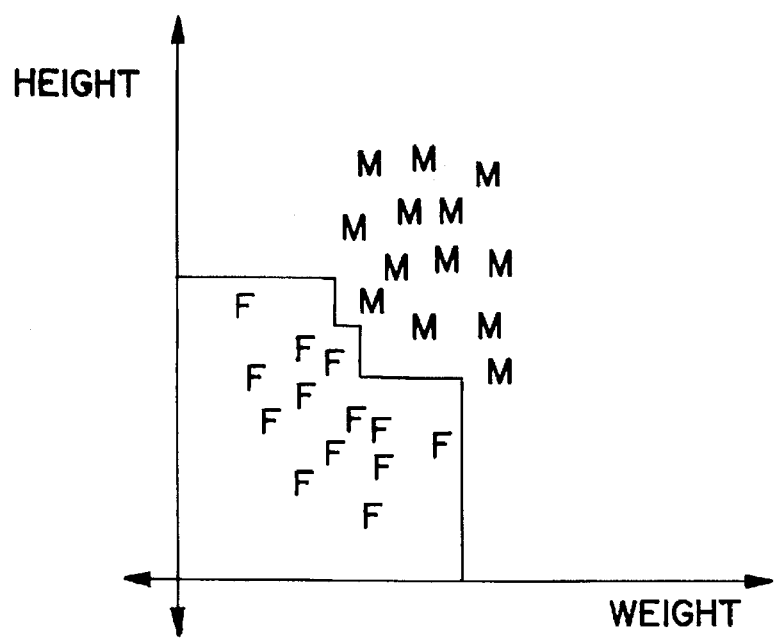
FIG. 3a and 3b are representations of feature space partitioning by a (prior art) decision tree and by a (prior art) neuron.
Figure 3B:
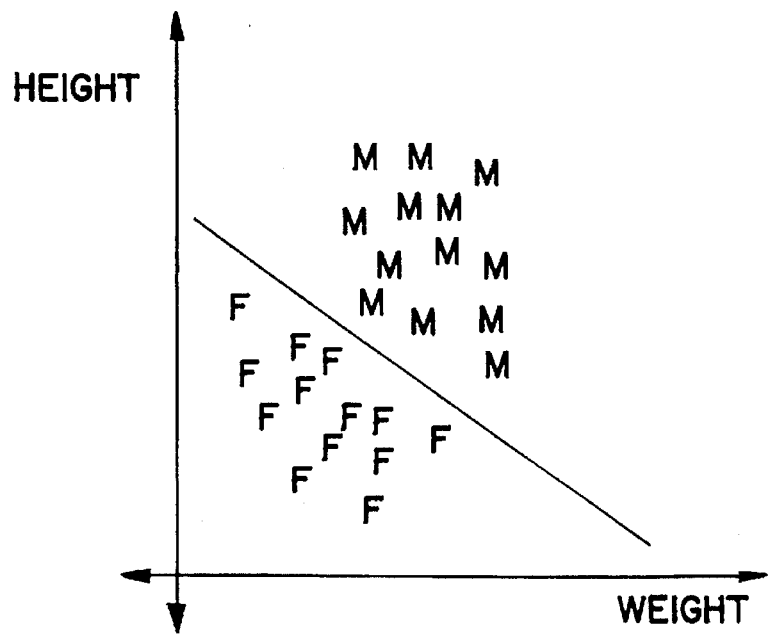
Figure 4:
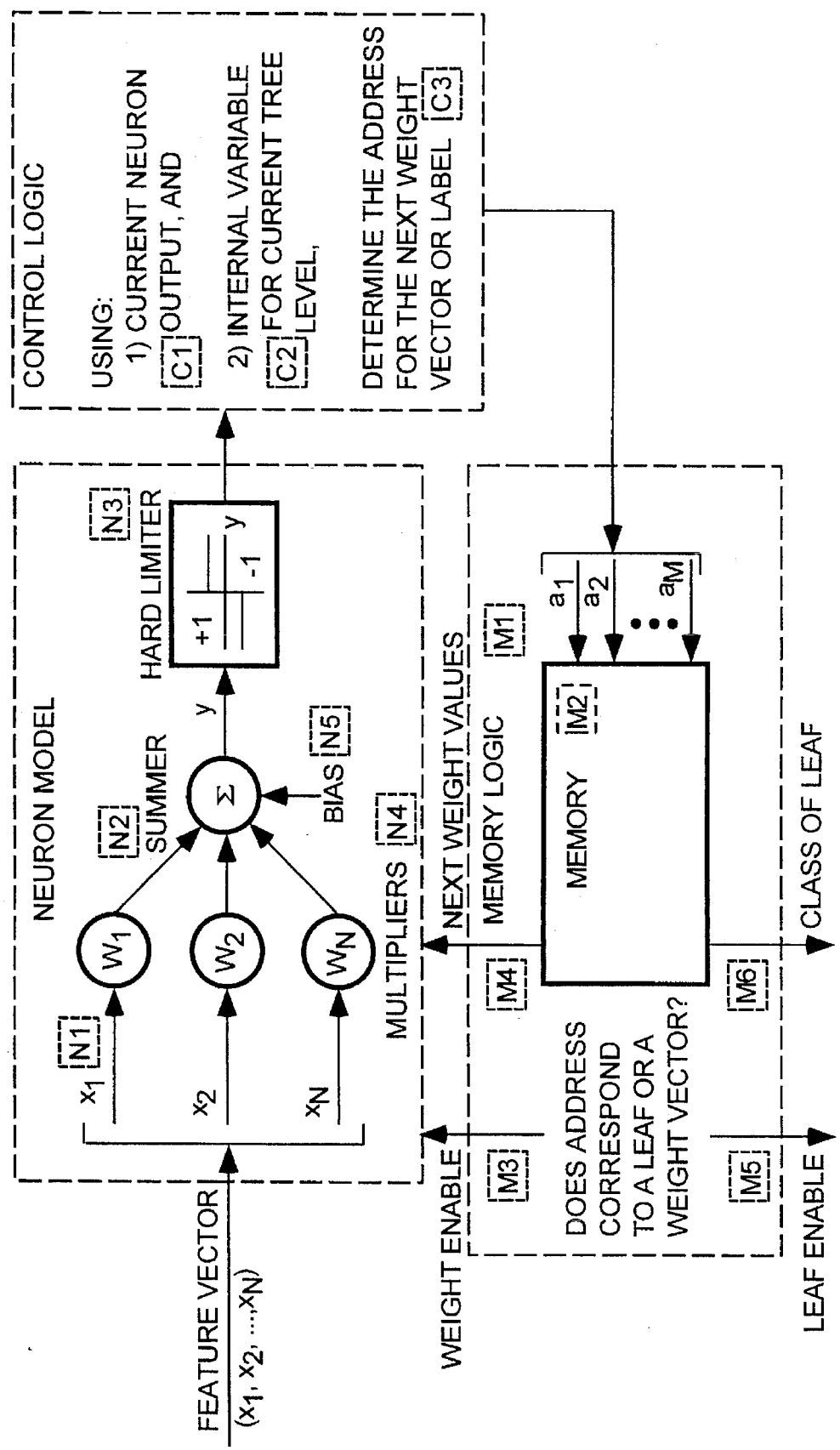
FIG. 4 is a representation of hardware for a neural tree network of the present invention, in its retrieval mode and using a lookup table.

The retrieval mode is the mode which is most frequently used. Retrieval for a binary NTN, as illustrated in FIG. 4, proceeds as follows. An N-dimensional feature vector to be classified, is applied to the NTN. The individual feature elements, labeled as N1, are each applied to a multiplier N4 to produce an output that is the product of the feature element and the corresponding weight. The multiplier weights and bias N5 will initially have values that correspond to the root node of the tree. The outputs of each multiplier and the bias are applied to a summer N2. The summer N2 adds the N multiplier outputs and bias value to obtain the output y. An alternative implementation can use a chip that is capable of performing vector multiplication. Here, the inputs would be the feature vector augmented with a "one" and the weight vector augmented with the bins value. This would replace the multipliers and summer shown as N2 and N4 in FIG. 4. The output y is then applied a hard limiter N3. If y is positive, the hard limiter outputs a one, or else it outputs a zero. The output of the hard limiter, i.e., the neuron output, is sent to control logic.

The control logic determines the address of the next set of weights or the class label. This address can be found using the current neuron output C1 and the current tree level C2. The tree level C2 is initialized to the root level at the start of the label retrieval process for a feature vector. Each time a weight vector is retrieved for that class, the level is incremented. Conceptually, each "0" neuron output will correspond to a left child node and each "1" to a right child node. The address of the weights for the left or right child nodes C3 is output to memory logic.

The memory logic retrieves the data corresponding to the input address M1 from memory unit M2. The contents of this memory location include a bit dedicated to whether the data corresponds to a node or leaf. This bit is used to determine if a weight enable signal M3 or a leaf enable signal M5 should be high. If the weight enable signal M3 is high, the neuron model will accept the next set of weights and bias values and repeat the above procedure. If the leaf enable signal M5 is high, the class label for the leaf will be output.

This retrieval mode is for a binary, i.e., two class, NTN. The NTN can also be implemented for multiclass problems as follows. Instead of having one neuron in the "neuron model" box of FIG. 4, there will be one neuron per class. For example, a three class problem would require that the input feature vector be multiplied with three different sets of weights and summed with three different biases. Instead of using a hard limiter at the output of the summers, logic will be required to identify which summer has the maximum output. This information will then be provided to the control logic to determine the address for the next sets of weights, etc. Essentially, the only modification for the multiclass tree is in the neuron model, which has the subsequent processing is carried out by means comprising one of at least three logic branches, and the remaining blocks of FIG. 4 remain the same.

Figure 5:
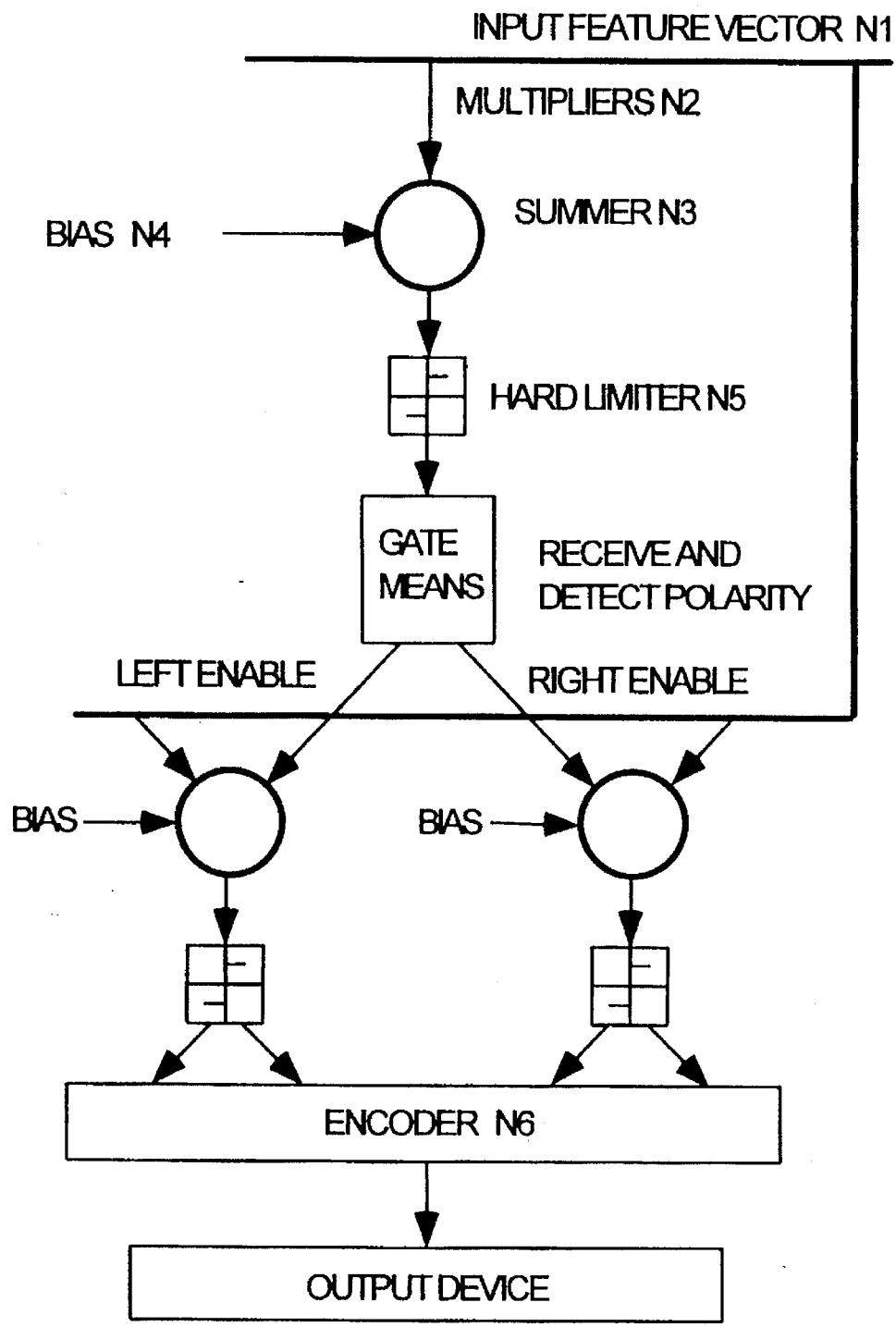
FIG. 5 is a representation of an alternate embodiment of the hardware for the neural tree network of the present invention, in its retrieval mode and without using a lookup table.

An alternative embodiment of the present invention, represented in FIG. 5, does not use a lookup table in a hardware implementation. Instead of using the hardware for one node and having the lookup table retrieve the weights, the hardware can be provided for each node. In FIG. 5, an input feature vector N1 would first be applied to an array of multipliers N2. There is one multiplier per feature element, hence for a 10 dimensional feature vector, there would be 10 multipliers. The outputs of the multipliers along with a bias value N4 are then input to a summer N3. The summer N3 will output a number that, if positive, will correspond to one class N3 and otherwise to the other class, as implemented by hard limiter N5. Depending on the output of the hard limiter N5, either the left enable signal, or right enable signal will be activated by a gate means, such as a comparator or logic device. This gate means enables the appropriate downstream hardware, which is identical to that previously described with respect to the first embodiment. Finally, at the leaf level of the tree, an encoder N6 is used to map the activated leaf to output a compact binary number representative of the class. Note that for large NTNs, the lookup table approach is much more practical to implement because there is much less hardware.

2. Training Mode a. Generally

The weights and their structure (or sequence) are determined during the training mode. The training mode requires training data that is characteristic of the problem to be learned by the NTN. The training data includes a set of feature vectors and their corresponding class labels, i.e., numbers or codes that represent which class the feature vector belongs. The set of feature vectors and class labels comprise the input for the NTN training process.

Figure 6:
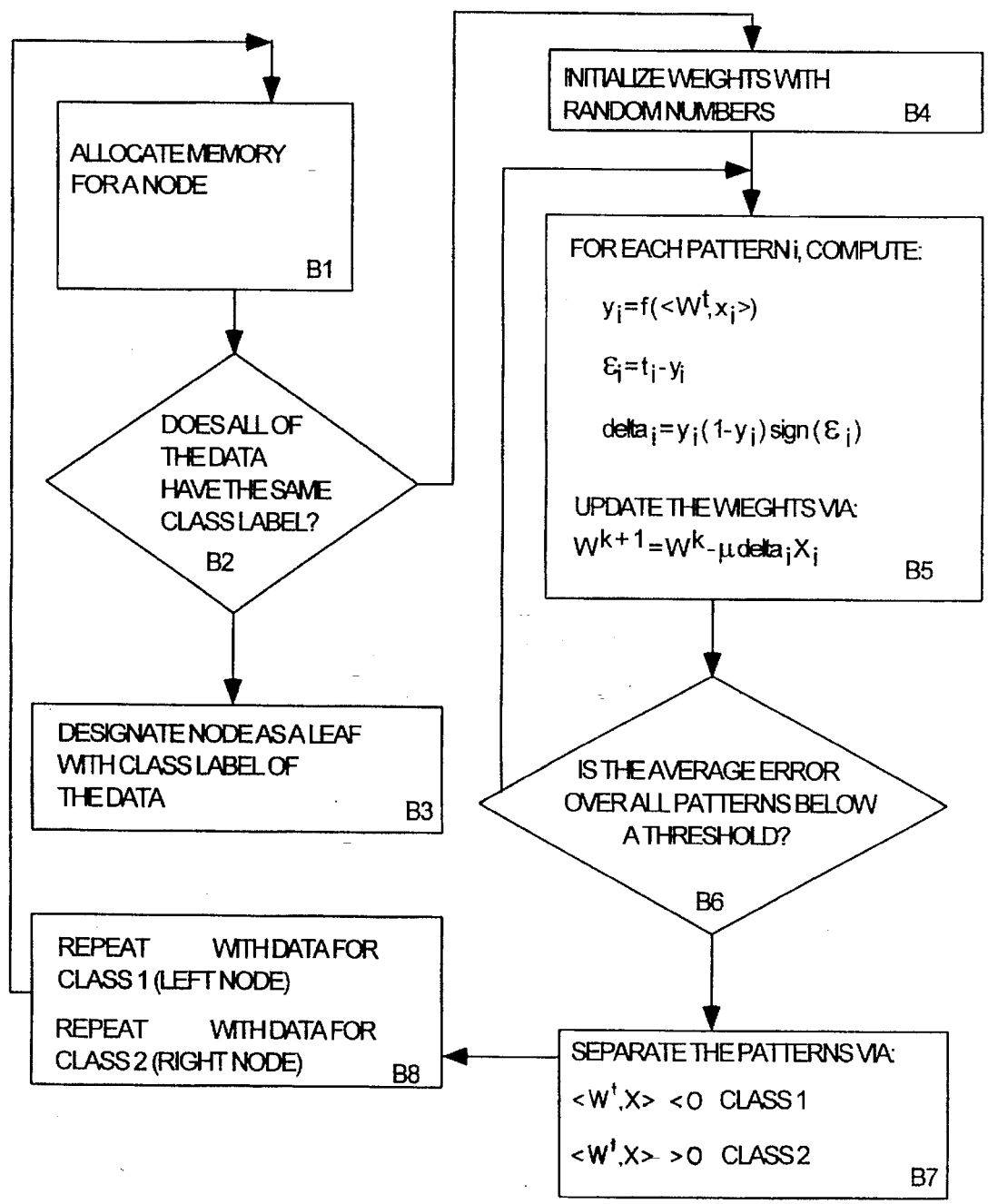
FIG. 6 is a representation of the flowchart for the binary neural tree network training process.

The training process for the NTN is illustrated in FIG. 6. The input consists of M N-dimensional feature vectors along with their associated class labels. First, memory for a node is allocated at step B1. The node requires memory to store the weights, bias, and addresses of the next nodes in a sequence, i.e., the left or right child nodes, and the class label for that node (which is only used if the node is a leaf). For a multiclass tree, the node must be capable of storing the weights for each neuron, i.e., where there is one neuron per class, the bias value for each class, the addresses of the next nodes in the sequence, and the class label, if the node is a leaf. The label for each feature vector is checked to see if all of the vectors belong to the same class at step B2. If "yes", all vectors belong to the same class, and the data is already partitioned. The node is then designated as a leaf node, having the class label of the data within that node at step B3. If "no", the data does not belong to the same class, then the data is split as follows. First, the N-dimensional weight vector W is initialized to random numbers at step B4. The dot product of the weight vector W and the $i^{th}$ input vector $X^i$ is computed. The output $y^i$ is found by applying a sigmoid to this dot product, $y^i=1/(1+e^{-<W,X^i>})$ The error $\epsilon_i$ is measured as the difference between the target label $t_i$ and the output $y_i$. The target label $t_i$ is the label provided with the feature vector which will be either a "0" or a "1," corresponding to one class or the other. The error is then used to determine a control factor for the amount of update via $\delta_i=y_i(1-y_i \, \text{sign} \, (\epsilon_i))$. The sign function is essentially a hard limiter, i.e., if $\epsilon$ is negative, a −1 is output, otherwise a +1 is output. The weight vector is then updated as $W^{k+1}=W^k-\mu\delta_i X_i$, where $\mu$ is a scaling constant within the range of 0 to 1. This sequence of steps B5 is repeated for each of the M patterns in the training set.

For a multiclass NTN, a set of weights must be trained for each class at each node. This is accomplished as follows. First, the feature vectors for one class are labeled as one, and the feature vectors for all other classes are labeled as zero. A neuron is then trained for this data using the algorithm described in the previous paragraph. Then, the feature vectors for the next class are labeled as one, and the remaining feature vectors are labeled as zero. A neuron is then trained for this data, and this procedure is repeated for each class. The rest of the training algorithm remains the same.

Note, for this process the weights are updated for each input pattern. An alternative process is to accumulate an update vector and update the weight vector only after all input patterns have been considered. The update vector is determined as:

$$v = \sum_{i=0}^{M} \mu \, \delta_i X_i.$$

After using all input vectors, the weight vector is then updated as:

$$W^{j+1}=W^j-V,$$

where j represents the iteration number. This is known as batch update because the weight vector is updated after the "batch" of inputs have been analyzed, as opposed to being updated after each individual input. Either update method can be used in the NTN.

For each pattern, a norm of the error is measured and saved. The average error of the M patterns can be found as:

$$\bar{\epsilon} = \frac{1}{M} \sum_{i=1}^{M} \epsilon_i^2,$$

for the $L_2$ norm. For the $L_1$ norm, the corresponding average error for the M patterns can be found as:

$$\bar{\epsilon} = \frac{1}{M} \sum_{i=1}^{M} |\epsilon_i|.$$

Both average error rates can be used, however, the $L_1$ norm is found to perform better for the NTN. After the weights have been updated for each of the M patterns, the average error is compared to a threshold at step B6. If the average error is above the threshold, then the above steps (B5) are repeated. If the error is below the threshold, then the weights have converged. The converged weight vector is then used to separate the training data into sets corresponding to the two classes. This is accomplished by evaluating the dot product of w and each x that was used to train the neuron at step B7. If this dot product is negative, assign the vector to class 1, otherwise, assign the vector to class 2. The feature vectors assigned to class 1 and then class 2 are then applied to the start of the flow diagram, step B1, and the process is repeated. This process continues until all of the training data is completely partitioned at the leaves.

b. Pruning

In pattern recognition tasks such as speech recognition, it is not always desirable to train a classifier to have 100% accuracy classification on the training data, as is done in with the NTN. This is known as "overtraining," which means that the NTN "learns" the training data so well that the generalization (performance on new data) suffers. The generalization for tree classifier processes can be improved by using a technique known as pruning. Pruning involves removing selected branches from the tree—branches that do not significantly contribute to the classification task. Removing branches tends to improve generalization at the expense of increasing the error on the training data. For example, a NTN that has classified 100% of its input training data may only be able to classify 80% of testing data (i.e., data not previously seen by the classifier). Pruning the tree may decrease the training data to, say, 90% of the input test data, but can improve the testing data performance to say 90%. Two pruning methods, known as backward and forward pruning, are proposed herein.

i. Backward Pruning

The backward pruning process begins with a full-grown NTN, i.e., a NTN that exhibits 100% classification performance on the training data. This tree will be referred to as T, for which a specific node can be designated as t. A branch, i.e., a node along with all of the nodes falling below it, will be referred to as $T_t$.

The backward pruning process is based on the minimization of a Lagrangian cost function:

$$C_\alpha(T) = D_T + \alpha N_T$$

where $D_T$ is the number of misclassifications, $N_T$ is the number of leaf nodes of tree T, $\alpha$ is a penalty factor associated with the leaf nodes, and $C_\alpha(T)$ is the cost of tree T for a given $\alpha$. In the above equation, it can be seen that for $\alpha=0$, the pruned subtree is T, i.e., the original tree itself. As $\alpha$ approaches infinity, the pruned subtree will become the root itself. For a given $\alpha$, the subtree that minimizes the cost in the above equation is defined as the optimal pruned subtree for that $\alpha$. The process to find the optimal pruned subtree proceeds as follows.

Consider the cost for a node t within tree T:

$$C_\alpha(t) = D_t + \alpha$$

where $D_t$ is the number of misclassifications for that node. Since t can be viewed as a tree that consists of one leaf, the term $N_t$ (from the original definition of the cost function) is equal to one and does not appear here. Now consider the cost for a branch $T_t$ within tree T:

$$C_\alpha(T_t) = D_{T_t} + \alpha N_{T_t}$$

Here, $D_{T_t}$ is the number of misclassifications for the branch $T_t$ and $N_{T_t}$ is the number of leaves within that branch. The $\alpha$ in these two equations can be equated to yield the following expression:

$$\alpha = \frac{D_{T_t} - D_t}{1 - N_{T_t}}$$

The penalty factor $\alpha$ as computed by the above equation corresponds to the point where the cost of node t is equal to the cost of branch $T_t$. The pruning process computes $\alpha$ as given in the above equation for all nodes in the tree. A threshold, denoted as $\alpha'$ is varied, starting from zero. Branches that correspond to nodes below this threshold are pruned (meaning that this part of the tree is removed and the node is assigned the label corresponding to the class majority at that node).

Consider the case when $\alpha'$ is zero. Since all non-leaf nodes must have $\alpha$ values that are greater than zero, no pruning is performed. Therefore the pruned tree for $\alpha'=0$ is the full tree T, referred to as $T(\alpha_0)$. The parameter $\alpha'$ is then increased until it exceeds the smallest $\alpha$ value, say $\alpha_1$, within tree T. At this point, the cost of the branch is greater than the cost of the node, so the branch corresponding to the node with $\alpha_1$ is pruned. This tree $T(\alpha_1)$, represents the next largest pruned subtree in the sequence of pruned subtrees. This process continues until only the root remains. This yields a sequence of pruned subtrees. Each of these pruned subtrees is tested with an independent data set, i.e., data that was not used for either training or for testing. The pruned subtree that performs the best on this independent data set is selected as the best pruned subtree. Because this process involves the removal of branches from a full-grown NTN, it is called a "backward" pruning approach. An alternative pruning process is "forward" pruning, which is described below.

ii. Forward Pruning

Forward pruning involves pruning the NTN while it is being grown. This can be accomplished by modifying the "stopping" criteria of the NTN, which is labeled as box B2 in FIG. 5. For example, in the NTN, if all of the vectors within a node belong to the same class, then the node becomes a leaf. Forward pruning modifies the stopping criteria such that when the majority of the vectors in a node fall within the same class, then the node is defined as a leaf. This leaf is then labeled as the class having the majority of the vectors. Intuitively, this will prevent the tree from growing unnecessarily large, i.e., having extra branches to classify only a small percent of the vectors. For example, if the data at a node consists of 99 vectors of one class and one vector from another class, then rather than growing several nodes to separate this one vector, pruning just makes the node a leaf and ignores the one vector.

Forward pruning is a faster and simpler process for pruning than the backward pruning process. Although the forward pruning process does not necessarily create an optimally pruned tree, this process can yield a satisfactory performance.

iii. Confidence Measures

For pruned NTNs, certain leaves will correspond to training data from several classes, though the leaf corresponds to the class contributing the majority. A confidence measure can be used, in addition to the class label, based on the amount of "confusion" at that node. For example, if a pruned node has 99 elements from class 1 and one element from class 2, then it can be said with confidence that the leaf is of class 1. On the other hand, if 51 elements are of class 1 and 49 elements are of class 2, then there is a low confidence that the leaf belongs to class 1. The confidence measure is computed as the ratio of the number of elements for the majority class to the total number of elements. Thus, the confidence in the first example above would be 99/100=0.99 and the confidence in the second example would be 51/100=0.51. The confidence measure provides a very useful measure of the validity for the classifier decision and can be used in both forward and backward pruning applications.

c. Feature Selection

As previously stated, a significant difference between the NTN and the decision tree is that the NTN uses the whole feature vector for its decision rather than just one element of this vector. However, it is also possible to use just subsets of this vector, as chosen via feature selection techniques. For example, if the input feature vector is 12 dimensional, the best discriminant may only require six of these dimensions at a node to make the decision. Similarly, the next node may only require four dimensions, etc. Thus, each node of the NTN uses a variable number of features, as found with standard feature selection techniques, such as the Karhunen-Loeve Transform (see for example, "An Introduction to Statistical Pattern Recognition," K. Fukunaga, Academic Press, 1972). The feature selection techniques can give a rough estimate as to which are the most relevant features for the given data. Each node of the NTN can use such a technique to select these features and train a discriminant based on only these features. This can lead to improved generalization.

APPLICATIONS FOR THE INVENTION

The NTN can be applied to several applications including voice recognition, face recognition, and explosive detection, by adding appropriate means to acquire the data. These illustrative applications are described in more detail as follows.

A. Speaker Recognition

Speaker recognition refers to recognizing a person based on his or her voice. The NTN can be applied to this problem as follows. A feature extraction means is used to obtain speech signals from people within a population to be recognized, i.e., 10 seconds of speech per person. Means suitable for this function can be determined from, for example, in U.S. Pat. No. 4,975,960 titled "Electronic Facial Tracking And Detection System And Method And Apparatus For Automated Speech Recognition" (Petajan) and U.S. Pat. No. 4,449,189 titled "Personal Access Control System Using Speech And Face Recognition" (Feix), both of which are incorporated by reference herein.

Feature vectors are then obtained for the speech signals. One example of a feature vector that can be used is the linear prediction-based cepstral vector. A NTN is then trained for each speaker as follows. The feature vectors for one person's speech are labeled as "one" while the feature vectors from everyone else are labeled as "zero".

A NTN is then trained for this person using this data. The feature vectors for the next speaker are then labeled as "one" and those for everyone else as "zero", and the NTN for this speaker is trained. This procedure is repeated until a NTN is trained for all of the speakers in the population. Ideally, when given a set of test vectors, the NTN corresponding to the speaker that generated those test vectors will output mostly ones, whereas the other NTNs will output mostly zeros.

In the retrieval mode, the present invention will successfully identify speakers.

B. Face Recognition

Another application of the NTN is for face recognition. Feature extraction means used for this application can also be obtained from the Petajan and Feix patents. For example, consider an image of a person's face that has been acquired in a digital format on a computer. The data from the horizontal and vertical scans can be collapsed into a feature vector that is representative of the different contours of a person's face. The NTN can be applied to this problem as follows. First, several images are obtained for each person within the population to be recognized. The corresponding feature vectors for each face are obtained. These feature vectors are then used to train a multiclass NTN. For example, if there are 10 people in the population to be recognized, and three images per person are acquired, then there will be 30 vectors in the training set. The three patterns for a given person will have the same label. A 10 class NTN is then trained for this problem using the 30 training patterns. For retrieval, a test pattern will be applied to the trained NTN and will be assigned the person corresponding to the leaf label.

C. Explosive and/or Drug Detection

Still, another application for the NTN is detecting an explosive and/or drug, for example, in airline luggage. Feature extraction means used for this application can be obtained from U.S. Pat. No. 5,247,561 titled "Luggage Inspection Device" (Kotowski), U.S. Pat. No. 5,175,756 titled "Device For Detecting Nitrogenous, Phosphoric, Chloric and Oxygenous Substances" (Bastian), and U.S. Pat. No. 5,007,072 titled "Diffraction Inspection System" (Jenkins), which are incorporated by reference herein.

More particularly, explosives often have a crystalline structure that tends to exhibits peaks in specific locations in frequency spectra, as examined under Fourier analysis. Thus, information within the frequency spectrum can be used to form a feature vector. The training data is acquired via numerous observations of explosive and non-explosive materials, such as aspirin, etc. By obtaining the feature vectors from explosive and non-explosive materials, a binary NTN can be trained for detecting explosives. In its retrieval mode, explosives can be detected in relatively inexpensive equipment located in airports to examine luggage.

We claim:

1. An electric neural tree network including:
   a node including multipliers respectively receiving signals representing feature vector elements and signals representing weight vector elements to produce product signals, a summer to add the product signals with a bias signal and output a sum signal to a hard limiter, the hard limiter for outputting a preliminary output signal having a polarity;
   gate means for enabling only one of a plurality of logic branches in response to the polarity of the preliminary output signal;
   means for assigning, electrically connected to the one logic branch, to assign weight elements to a next weight vector to be used in a subsequent processing of the next weight vector; and
   means for producing a label signal in response to the subsequent processing.

2. The electrical neural tree network of claim 1, wherein said means for assigning includes:
   control logic to determine an address for the weight elements to the next weight vector corresponding to the one of the at least two logic branches, the control logic also to determine an address for the label signal; and
   memory logic for storing data at the determined address, the data including the next weight vector and bias which are routed back to the node.

3. The electrical neural tree network of claim 1, wherein said means for assigning includes:

a bit to determine whether a weight enable signal should trigger loading the next weight vector and bias back to the node or whether a leaf enable signal should trigger a class signal to be output.

4. The electrical neural tree network of claim 1, further comprising:

gate means; and wherein the at least two logic branches each include:

a child node electrically connected to the gate means such that only one of the child nodes is enabled by the gate means receiving a value of the preliminary output signal to permit the processing of the next weight vector and bias.

5. The electrical neural tree network of claim 4, wherein the means for producing includes:

hard limiters respectively connecting some of the child nodes to an encoder to produce the label signal.

6. The electrical neural tree network of claim 1, further including:

a feature extractor examining speech signals for producing the signals representing feature vector elements; and wherein the label signal represents speaker recognition.

7. The electrical neural tree network of claim 1, further including:

a feature extractor examining face signals for producing the signals representing feature vector elements; and wherein the label signal represents face recognition.

8. The electrical neural tree network of claim 1, further including:

a feature extractor examining chemical analysis for producing the signals representing feature vector elements; and wherein the label signal represents chemical recognition.

9. The electrical neural tree network of claim 8, wherein:

the label signal represents recognition of an explosive.

10. The electrical neural tree network of claim 1, wherein:

the logic branches are organized hierarchically and limited in number by backward pruning.

11. A neural tree network processing electrical signals, the network including:

a node means for processing input electrical signals representing a weight vector and a feature vector, the weight vector being comprised of weight elements and the feature vector being comprised of feature elements, to produce a preliminary output signal; and gate means, electrically connected to the node means, for enabling only one of a plurality of logic branches in response to the polarity of the preliminary output signal; and means, electrically connected to the means for enabling for assigning weight elements to a next weight vector to be used in a subsequent processing by the neural tree network.

12. The neural tree network of claim 11, further comprising:

child nodes, electrically connected to the means for assigning such that the enabling only one of at least two logic branches enables only one of the child nodes to perform the subsequent processing by receiving and processing the weight elements of the next weight vector and the feature elements.

13. The neural tree network of claim 11, wherein:

the means for assigning includes memory means for storing a lookup table containing a plurality of sets of weight elements such that the enabling only one of at least two logic branches enables only one of the sets of weight elements to be used in the next weight vector, and wherein said next weight vector and the feature elements are routed back to the node to perform the subsequent processing by receiving and processing the weight elements of the next weight vector and the feature elements.

14. The neural tree network of claim 11, wherein:

the means for enabling includes gate means to enable the one of the logic branches in response to the polarity of the preliminary output signal.

15. The neural tree network of claim 11, wherein:

the electric neural tree network is produced by training to produce a hierarchical organization of the weight vectors; and wherein:

the processing includes implementing a linear sequential decision at each said node until a label is produced at a leaf node for training data.

16. The neural tree network of claim 15, wherein the hierarchical organization is formed by training the neural tree network by a method including backward pruning.

17. The neural tree network of claim 16, wherein the method of training includes determining a confidence measure for each said leaf node.

18. The neural tree network of claim 15, wherein the hierarchical organization is formed by training the neural tree network by a method including forward pruning.

19. The neural tree network of claim 18, wherein the method of training includes determining a confidence measure for each said leaf node.

20. The neural tree network of claim 11, further comprising a feature extractor for producing the signals representing feature vector elements, the feature elements from feature data produced by feature analysis performed by the feature extractor.

21. A method of using an electric neural tree network, the method including the steps of:

producing a preliminary output signal having a polarity by a node in which respective multipliers respectively receive signals representing feature vector elements and signals representing weight vector elements to produce product signals, a summer adds the product signals with a bias signal and outputs a sum signal to a hard limiter, and the hard limiter outputs the preliminary output signal;

enabling only one of a plurality of logic branches with the preliminary output signal;

assigning weight elements to a next weight vector to used in a subsequent processing of the next weight vector, the step of assigning being carried out until a label signal is to be produced; and subsequent to the step of assigning, producing the label signal from the neural tree network.

22. The method of claim 21, wherein the step of assigning includes:

determining with control logic means an address for weight elements to the next weight vector corresponding to the one of the at least two logic branches; and storing in a logic memory data at the determined address, the data including the next weight vector and bias which are routed back to the node.

23. The method of claim 21, wherein the step of assigning includes:

designating a bit value to determine whether a weight enable signal should to trigger loading the next weight vector and bias back to the node or whether a leaf enable signal should to trigger a class signal to be output.

24. The method of claim 21, wherein the step of assigning includes:

routing the preliminary output signal to gate means, and triggering the gate means with the polarity of the preliminary output signal; and wherein the at least two logic branches each include:

child nodes electrically connected to the gate means such that only one of the child nodes is enabled by the gate means receiving a value of the preliminary output signal to permit the processing of the next weight vector and bias.

25. The method of claim 24, wherein the step of producing includes:

producing the label signal at an encoder by hard limiters respectively connecting some of the child nodes to the encoder.

26. The method of claim 21, further including:

producing the signals representing feature vector elements by means including a feature extractor examining signals representing speech; and wherein the label signal represents speaker recognition.

27. The method of claim 21, further including the step of:

producing the signals representing feature vector elements by means including a feature extractor examining signals representing a face; and wherein the label signal represents face recognition.

28. The method of claim 21, further including the step of:

producing the signals representing feature vector elements by means including a feature extractor examining signals representing at least one chemical; and wherein the label signal represents chemical recognition.

29. The method of claim 28, wherein the step of producing the signals representing feature vector elements is carried out so that the label signal represents chemical recognition of an explosive.

30. The method of claim 21, further comprising the step of:

powering the logic branches that were organized hierarchically and limited in number by backward pruning.

31. A method of using a neural tree network processing electrical signals, the method including the steps of:

producing a preliminary output signal from a node having means for processing a weight vector and an input feature vector, the weight vector being comprised of weight elements and the feature vector being comprised of feature elements, to produce a preliminary output signal; and enabling only one of a plurality of logic branches by the preliminary output signal; and in the one logic branch, assigning weight elements to a next weight vector to be used in a subsequent processing by the neural tree network to produce a label.

32. The method of claim 31, further comprising the step of:

only one of at least two logic branches to enable only one of at least two child nodes to perform the subsequent processing by receiving and processing the weight elements of the next weight vector and the feature elements.

33. The method of claim 31, wherein the step of assigning includes:

storing in a memory a lookup table containing a plurality of sets of weight elements such that the enabling only one of at least two logic branches enables only one of the sets of weight elements for the next weight vector, and wherein said next weight vector and the feature elements are routed back to the node to perform the subsequent processing by receiving and processing the weight elements of the next weight vector and the feature elements.

34. The method of claim 31, wherein the preliminary output signal has a polarity, and wherein the step of enabling only one of at least two logic branches includes routing the preliminary output signal to gate means to be triggered by the polarity.

35. The method of claim 31, wherein the steps are carried out by an electric neural tree network structured by training to produce a hierarchical organization of the weight vectors; and wherein method is limited to processing in accordance with a linear sequential decision at each said node until the label is produced at a leaf node for training data.

36. The method of claim 35, wherein the steps are carried out with the hierarchical organization having been formed by training the neural tree network by a method including backward pruning.

37. The method of claim 36, wherein the method of training includes a step of determining a confidence measure for each said leaf node.

38. The method of claim 35, wherein the steps are carried out with the hierarchical organization having been formed by training the neural tree network by a method including forward pruning.

39. The method of claim 38, wherein the method of training includes a step of determining a confidence measure for each said leaf node.

40. The method of claim 31, further comprising a step of:

producing the signals representing feature vector elements by a feature extractor, the feature elements being a subset of feature data produced by feature analysis performed by the feature extractor.

41. A method of making an electric neural tree network, the method including the steps of:

constructing a node by electrically connecting multipliers to respectively receive signals representing feature vector elements and signals representing weight vector elements and to produce product signals, electrically connecting a summer to add the product signals with a bias signal and output a sum signal, and electrically connecting a hard limiter to receive the sum signal and output a preliminary output signal having a polarity;

electrically connecting a gate means for enabling only one of a plurality of logic branches in response to the polarity of the preliminary output signal;

electrically connecting to the one logic branch a means for assigning weight elements to a next weight vector to be used in a subsequent processing; and electrically connecting a means for producing the label signal from an output signal produced by the subsequent processing.

42. The method of claim 41, wherein the means for assigning includes:

control logic means for determining an address for weight elements to the next weight vector corresponding to the one of the at least two logic branches, the control logic also to determine an address for the label signal, said control logic means being electrically linked to memory logic for storing data at the determined address, the data including the next weight vector and bias which are routed back to the node.

43. The method of claim 41, wherein the step of electrically connecting the means for assigning includes:

designating a bit value to determine whether a weight enable signal should trigger loading the next weight vector and bias back to the node or whether a leaf enable signal should trigger a class signal to be output.

44. The method of claim 41, wherein the step of electrically connecting means for assigning includes:

providing an electrical rout for the preliminary output signal having the polarity to be directed to gate means to be triggered by the polarity; and wherein the at least two logic branches include respective child nodes electrically connected to the gate means such that only one of the child nodes is enabled by the triggered gate means to permit the processing of the next weight vector and bias.

45. The method of claim 44, further comprising the step of:

locating an encoder to receive signals output by hard limiters respectively connected electrically between leaf nodes and the encoder to construct the label signal.

46. The method of claim 41, further including the step of:

electrically connecting means for producing to produce the signals representing feature vector elements from electrical signals produced by a feature extractor examining signals representing speech so that the label signal represents speaker recognition.

47. The method of claim 41, further including the step of:

electrically connecting means for producing to produce the signals representing feature vector elements from electrical signals produced by a feature extractor examining signals representing a face so that the label signal represents face recognition.

48. The method of claim 41, further including the step of:

electrically connecting means for producing to produce the signals representing feature vector elements from electrical signals produced by a feature extractor examining signals representing at least one chemical so that the label signal represents chemical recognition.

49. The method of claim 48, wherein the step of electrically connecting means for producing to produce the signals representing feature vector elements is carried out so that the label signal represents recognition of an explosive.

50. The method of claim 41, further comprising the step of:

organizing the logic branches hierarchically by backward pruning.

51. A method of making a neural tree network processing electrical signals, the method including the steps of:

providing electricity to a node to process a weight vector and an input feature vector, the weight vector being comprised of weight elements and the feature vector being comprised of feature elements, and to produce a preliminary output signal; and providing the preliminary output signal to gate means to enable only one of a plurality of logic branches; and electrically connecting to the one logic branch a means for assigning weight elements to a next weight vector to be used in a subsequent processing by the neural tree network to produce a label signal.

52. The method of claim 51, wherein the the means for assigning is electrically connected to child nodes such that only one of the child nodes is enabled to perform the subsequent processing by receiving and processing the weight elements of the next weight vector and the feature elements.

53. The method of claim 51, wherein the means for assigning includes:

memory means storing a lookup table containing a plurality of sets of weight elements such that the enabling only one of at least two logic branches enables only one of the sets of weight elements for the next weight vector, and wherein said next weight vector and the feature elements are routed back to the node to perform the subsequent processing.

54. The method of claim 51, wherein the preliminary output signal has a polarity and wherein the step of providing the preliminary output signal includes:

routing the preliminary output signal to gate means trigger by the polarity of the preliminary output signal.

55. The method of claim 51, wherein the steps are carried out to structure the electric neural tree network by training to produce a hierarchical organization of the weight vectors; and wherein the training includes a method of processing in accordance with a linear sequential decision at each said node until the label is produced at a leaf node for training data.

56. The method of claim 55, wherein the steps are carried out with the hierarchical organization having been formed by training the neural tree network by a method including backward pruning.

57. The method of claim 56, wherein the method of training includes a step of determining a confidence measure for each said leaf node.

58. The method of claim 55, wherein the steps are carried out with the hierarchical organization having been formed by training the neural tree network by a method including forward pruning.

59. The method of claim 58, wherein the method of training includes a step of determining a confidence measure for each said leaf node.

60. The method of claim 51, further comprising a step of:

producing the signals representing feature vector elements by a feature extractor, the feature elements being a subset of feature data produced by feature analysis performed by the feature extractor.

61. The neural tree network of any one of claims 1 or 11 or the method of any one of claims 21, 31, 41, or 51, wherein:

the subsequent processing is carried out by means comprising one of at least three logic branches.

* * * * *